US009860822B2

(12) United States Patent
Hurd et al.

(10) Patent No.: US 9,860,822 B2
(45) Date of Patent: Jan. 2, 2018

(54) METHOD AND NETWORK NODE FOR DETERMINING ADMITTANCE BASED ON REASON FOR NOT ACHIEVING QUALITY OF SERVICE

(75) Inventors: Magnus Hurd, Stockholm (SE); Andreas Kågedal, Linköping (SE); Lars Näslund, Solna (SE); Ying Sun, Sundbyberg (SE); Kai-Erik Sunell, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 241 days.

(21) Appl. No.: 14/383,537

(22) PCT Filed: Mar. 6, 2012

(86) PCT No.: PCT/SE2012/050248
§ 371 (c)(1),
(2), (4) Date: Dec. 16, 2014

(87) PCT Pub. No.: WO2013/133738
PCT Pub. Date: Sep. 12, 2013

(65) Prior Publication Data
US 2015/0109910 A1 Apr. 23, 2015

(51) Int. Cl.
*H04W 48/06* (2009.01)
*H04W 28/02* (2009.01)
(Continued)

(52) U.S. Cl.
CPC .......... *H04W 48/06* (2013.01); *H04L 1/1887* (2013.01); *H04W 28/0242* (2013.01);
(Continued)

(58) Field of Classification Search
CPC ............. H04W 48/06; H04W 28/0284; H04W 28/0247; H04W 28/0242
See application file for complete search history.

(56) References Cited

U.S. PATENT DOCUMENTS 8,040,803 B1 * 10/2011 Pawar ................ H04W 72/085
370/231
2005/0094560 A1 5/2005 Montes Linares
(Continued)

FOREIGN PATENT DOCUMENTS

EP 0913968 A1 5/1999
EP 1 154 663 A1 11/2001
(Continued)

OTHER PUBLICATIONS

European Search Report for Application No. 12 870 530.8, dated May 28, 2015, 6 pages.
(Continued)

Primary Examiner — Hassan Kizou
Assistant Examiner — Deepa Belur
(74) Attorney, Agent, or Firm — Nicholson De Vos Webster & Elliott LLP

(57) ABSTRACT

Network node (110) and method (600) in a network node (110), for admission control of a request for a radio access bearer to be received from a user equipment (120). The method (600) comprises monitoring (601) the achievement of quality of service requirement of an admitted radio access bearer, detecting (602) when the quality of service requirement of the admitted radio access bearer is not achieved, assessing (603) a reason why the quality of service of the admitted radio access bearer is not achieved, and determining (604) admittance of a further request for radio access bearer, based on the reason why the quality of service of the admitted radio access bearer is not achieved.

30 Claims, 8 Drawing Sheets

(51) Int. Cl.
*H04L 1/18* (2006.01)
*H04L 12/801* (2013.01)

(52) U.S. Cl.
CPC ... *H04W 28/0247* (2013.01); *H04W 28/0268* (2013.01); *H04W 28/0284* (2013.01); *H04L 47/14* (2013.01)

(56) References Cited

U.S. PATENT DOCUMENTS

| | | | | |
|---|---|---|---|---|
| 2007/0053288 A1* | 3/2007 | Stern-Berkowitz | H04W 72/087 | 370/229 |
| 2008/0046963 A1* | 2/2008 | Grayson | H04L 12/66 | 726/1 |
| 2008/0186862 A1* | 8/2008 | Corbett | H04W 72/0486 | 370/237 |
| 2008/0310322 A1* | 12/2008 | Tidestav | H04W 16/18 | 370/253 |
| 2009/0067335 A1* | 3/2009 | Pelletier | H04L 41/5025 | 370/238 |
| 2013/0042278 A1* | 2/2013 | Won | H04L 65/607 | 725/62 |
| 2013/0051332 A1* | 2/2013 | Sridhar | H04W 48/06 | 370/329 |
| 2013/0155966 A1* | 6/2013 | Bekiares | H04W 28/16 | 370/329 |
| 2013/0170350 A1* | 7/2013 | Sarkar | H04W 28/24 | 370/235 |
| 2013/0194919 A1* | 8/2013 | Garavaglia | H04W 28/0268 | 370/229 |
| 2014/0113676 A1* | 4/2014 | Hamalainen | H04W 72/046 | 455/522 |
| 2017/0118795 A1* | 4/2017 | Guo | H04W 76/06 | |
| 2017/0244639 A1* | 8/2017 | Szilagyi | H04L 47/12 | |

FOREIGN PATENT DOCUMENTS

| | | |
|---|---|---|
| EP | 2237596 A1 | 10/2010 |
| WO | WO-03077582 A1 | 9/2003 |
| WO | 2011/156264 A2 | 12/2011 |
| WO | 2011/156264 A3 | 12/2011 |

OTHER PUBLICATIONS

A. Gonguet et al., "Diagnosis of QoS degradation in Multi-Standard Radio Networks", Telecommunications, Proceedings of the 8th International Conference on Zagreb, Jun. 15-17, 2005, Jun. 15, 2005, pp. 211-218.

Notification of Transmittal of the International Search Report and the Written Opinion of the International Searching Authority, or the Declaration for counterpart application PCT/SE2012/050248, dated Mar. 7, 2013, 16 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.5.0, Sep. 2011, 194 pages, 3GPP Organizational Partners, Valbonne, France.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.0.0, Dec. 20, 2011, pp. 115-118.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.4.0, Dec. 22, 2011, pp. 33-65.

"3rd Generation Partnership Project; Technical Specification Group Radio Access Network; Evolved Universal Terrestrial Radio Access Network (E-UTRAN); S1 Application Protocol (S1AP) (Release 10)," 3GPP TS 36.413 V10.4.0, Dec. 20, 2011, pp. 22-24 and 99-129.

"3rd Generation Partnership Project; Technical Specification Group Radio Access Network; Evolved Universal Terrestrial Radio Access Network (E-UTRAN); S1 Application Protocol (S1AP) (Release 10)," 3GPP TS 36.413 V10.3.0, Sep. 2011, 254 pages, 3GPP Organizational Partners, Valbonne, France.

Elias Z. Tragos, et al., "Admission Control for QoS Support in Heterogeneous 4G Wireless Networks," IEEE Network, vol. 22, No. 3, May/Jun. 2008, pp. 30-37.

* cited by examiner

METHOD AND NETWORK NODE FOR DETERMINING ADMITTANCE BASED ON REASON FOR NOT ACHIEVING QUALITY OF SERVICE

CROSS-REFERENCE TO RELATED APPLICATIONS

This application is a National stage of International Application No. PCT/SE2012/050248, filed Mar. 6, 2012, which is hereby incorporated by reference.

TECHNICAL FIELD

Implementations described herein relate generally to a network node and a method in a network node. In particular is herein described an admission control of a request for a radio access bearer to be received from a user equipment.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be portable and enabled to communicate voice and/or data, via the radio access network, with another entity, such as a network node, for example.

The wireless communication system covers a geographical area which is divided into cell areas, with each cell area being served by a network node, or base station as it also may be referred to, such as e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One network node, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units.

The 3rd Generation Partnership Project (3GPP) has undertaken to evolve further the UTRAN and GSM based radio access network technologies, for example by developing Long Term Evolution (LTE) and the Evolved Universal Terrestrial Radio Access Network (E-UTRAN).

LTE is a technology for realizing high-speed packet-based communication that may reach high data rates both in the downlink and in the uplink. In LTE, network nodes, which may be referred to as evolved-NodeBs, eNodeBs or even eNBs, may be connected to a gateway e.g. a radio access gateway, which in turn may be connected to one or more core networks.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

The network node which is serving a cell, is also determining which user equipment to serve via the network node and which user equipment to reject service when an establishment request is made for a radio access bearer. This is referred to as Admission Control. In mobile radio communication systems, these establishment requests are made for new radio access bearers. The task of the Admission Control is thus to admit or reject resource requests, based on various factors. Admission Control considers the overall resource situation, e.g. in the network nodes and infrastructure comprising both radio access network and core network, the QoS requirements of the radio access bearer, the priority levels and the provided QoS of in-progress sessions and the QoS requirement of the new radio access bearer request. A request for a radio access bearer, for which the requested QoS cannot be met, may consequently be rejected by the network node.

The Scheduler is a functionality within the network node, responsible for dynamically assigning resources to a radio access bearer, such that (i) its requested Quality of Service in terms of for instance delay requirements are met and (ii) its priority level compared to other bearers with Quality of Service requirements are considered. Within the context of this disclosure, the non-limiting examples are given within an E-UTRA context, comprising E-UTRA Radio Access Bearers (E-RABs).

Each request for a radio access bearer, or E-RAB (the expressions may be used interchangeably within the present context), comes with a QoS requirement and a priority number. The Scheduler, upon receiving the request, tries to assign resources to the QoS E-RABs to fulfil their QoS requirements. Whenever the Scheduler is congested, it assigns resources such that the QoS requirements are fulfilled in the order indicated by the priority of the QoS E-RABs.

Scheduling may also consider channel quality. Then E-RABs with good channel quality are selected for scheduling prior to E-RABs with bad channel quality.

It is reasonable to monitor how well the Scheduler succeeds to serve the QoS requirements of the E-RABs. There may be congestion or out-of-coverage scenarios when it is no longer possible to maintain the requested QoS of the E-RAB, no matter what policies are used for scheduling the E-RAB. Whenever the QoS requirement for an E-RAB consistently fails, one may release the QoS E-RAB since it does not anyway contribute to the system capacity.

Since the Scheduler considers a priority whenever the E-RABs are congested, QoS requirements of E-RABs with less important priority tend to get stressed first. This tendency is then followed when releasing E-RABs due to failed QoS. QoS E-RABs are pre-empted, or released, in order of the priority considered by the Scheduler.

A problem that arises is that a pre-empted QoS E-RAB of a certain QoS Class Identifier (QCI) makes its user equipment immediately request for setting up another E-RAB of the same QCI. For example, interrupted voice calls usually results in a redial. Similar kind of behaviour is expected from machine-to-machine applications e.g. in smart phones and tablets.

The QoS prospects for such immediately triggered E-RAB requests are not good since a similar kind of radio bearer with same QCI has been recently dropped due to lack of resources and it may be expected that the situation will not change rapidly.

Thus there are room for improvement of the Admission Control within a network node, in order to better utilise the scheduled resources.

SUMMARY

It is therefore an object to obviate at least some of the above mentioned disadvantages and to improve the performance in a wireless communication system.

According to a first aspect, the object is achieved by a method in a network node. The method aims at performing admission control of a request for a radio access bearer to be received from a user equipment. The method comprises monitoring the achievement of quality of service requirement of an admitted radio access bearer. Further, the method comprises detecting when the quality of service requirement of the admitted radio access bearer is not achieved. Also, in addition, the method comprises assessing a reason why the quality of service of the admitted radio access bearer is not achieved. Furthermore, the method also comprises determining admittance of a further request for radio access bearer, based on the reason why the quality of service of the admitted radio access bearer is not achieved.

According to a second aspect, the object is achieved by a network node. The network node is configured for admission control of future requests for radio access bearers, to be received from a user equipment. The network node comprises a processing circuit. The processing circuit is configured to monitor achievement of quality of service requirement of an admitted radio access bearer. The processing circuit is also configured to detect when the quality of service requirement of the admitted radio access bearer is not achieved. Further, the processing circuit is in addition configured to assess a reason why the quality of service of the admitted radio access bearer is not achieved. Also, additionally, the processing circuit is further configured to determine admittance of further request for radio access bearer, based on the reason why the quality of service of the admitted radio access bearer is not achieved.

Thanks to embodiments disclosed herein, pointless admissions of quality of service radio access bearers to user equipment which anyway cannot take advantage of the resource as they have insufficient coverage may be avoided. Thereby, a higher system capacity and more efficient use of resources are achieved.

Further, according to embodiments herein, rejects may be based on quality of service congestion per quality of service class identifier, so the rejects are more accurate i.e. unneeded rejects for non-congested quality of service class identifiers may be avoided. According to embodiments herein, requested radio access bearers (pre-emptable and not pre-emptable alike) may be rejected for the congested quality of service class identifier, which improves the performance of the wireless communication system.

Other objects, advantages and novel features will become apparent from the following detailed description of the present methods and network node.

BRIEF DESCRIPTION OF THE DRAWINGS

The method and network node are described in detail with reference to attached drawings illustrating examples of embodiments in which.

DETAILED DESCRIPTION

Embodiments herein are defined as a network node and a method in a network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
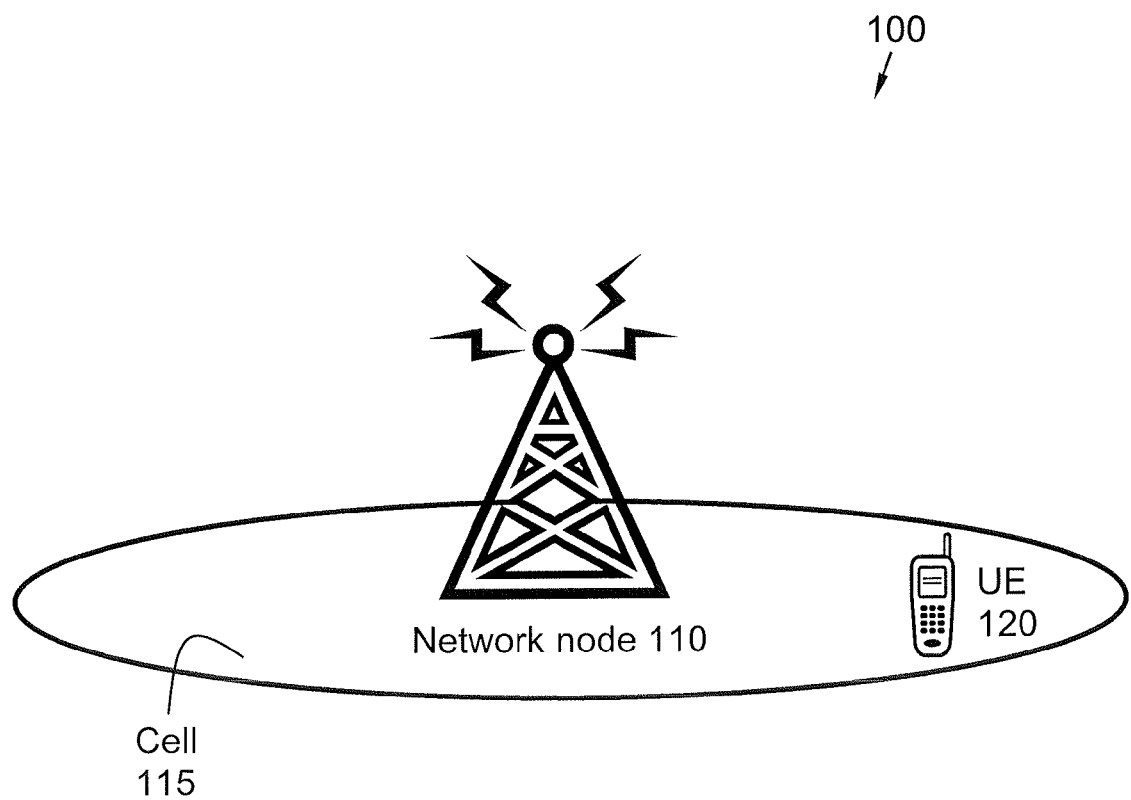
FIG. 1 is a schematic block diagram illustrating an example of a wireless communication system according to some embodiments.

FIG. 1 depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some few options.

The wireless communication system 100 may further be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1 is to provide a simplified, general overview of the methods and network nodes herein described, and the functionalities involved. The methods and network nodes will subsequently, as a non-limiting example, be described in a 3GPP/LTE environment, but the embodiments of the disclosed methods may operate in a wireless communication system 100 based on another access technology.

The wireless communication system 100 comprises at least one network node 110, which is serving a cell 115, in which a user equipment 120 is situated, served by the network node 110.

The user equipment 120 is configured to transmit radio signals comprising information to be received by the serving network node 110. Further, the user equipment 120 is configured to receive radio signals comprising information transmitted by the network node 110. The communication between the network node 110 and the user equipment 120 is thus made wirelessly over a radio interface which here is referred to as a radio access bearer, or E-RAB.

It is to be noted that the illustrated network setting of network node 110 and user equipment 120 in FIG. 1 is to be regarded as a non-limiting embodiment only. The wireless communication network 100 may comprise any other number and/or combination of network node 110 and user equipment 120, although only one instance of each of them, respectively, are illustrated in FIG. 1 for clarity reasons. A plurality of network nodes 110 and/or user equipment units 120 may further be involved in the present methods according to some embodiments.

Thus whenever "one" or "a/an" network node 110 and/or user equipment 120 is referred to in the present context, a plurality of network nodes 110 and/or user equipment units 120 may be involved, according to some embodiments.

The network node 110 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device or any other network node configured for communication with the user equipment 120 over a wireless interface, depending e.g. of the radio access technology and terminology used.

In the subsequent part of the disclosure, in order to not unnecessarily complicate the explanation, the methods and structural elements comprised in the scenario depicted in FIG. 1 will be described, wherein the term "network node" will be used for the network node 110, while the term "user equipment" will be used for the user equipment 120, in order to facilitate the comprehension of the present methods.

The user equipment 120 may be represented by e.g. a wireless communication terminal, a mobile cellular phone, a Personal Digital Assistant (PDA), a wireless platform, a mobile station, a portable communication device, a laptop, a computer, a computer tablet, a wireless terminal acting as a relay, a relay node, a mobile relay, a Customer Premises Equipment (CPE), a Fixed Wireless Access (FWA) nodes or any other kind of device configured to communicate wirelessly with the network node 110.

The network node 110 controls the radio resource management within the cell 115, such as e.g. allocating radio resources to the user equipment units 120 within the cell 115 and ensuring reliable wireless communication between the network node 110 and the user equipment 120, at a requested quality of service. The network node 110 may comprise an E-UTRAN logical node eNodeB, e.g. in an LTE-related wireless communication system 100. However, EUTRA standard is used herein merely as an illustrative, non-limiting example. The methods described herein may be generalised to any radio access system technology and standard, in particular those that makes use of 3GPP quality of service framework.

It is to be noted that commercial implementations of EUTRA standard are also termed as Long Term Evolution (LTE), where the same term refers to terminal and network side implementation as well as the actual radio interface.

According to embodiments herein, the problem of identifying whether the quality of service failure of a particular radio access bearer was due to bad coverage of the associated user equipment 120, or due to congestion within the wireless communication system 100 and/or at the network node 110 is solved, or until the user equipment 120 has been identified to enter sufficient coverage. If the reason is bad coverage, Admission Control may target an individual user equipment 120, for example by barring it from access for a certain period of time, e.g. until a watchdog timer has expired. If the reason instead is congestion, Admission Control may target a class of user equipments 120, requesting the same quality of service radio access bearer as the one that failed, and/or having the same or lower priority level.

An aspect of the method herein is thus for the Admission Control of the network node 110 to determine whether failing a certain quality of service requirement for a radio access bearer of a user equipment 120 was due to bad coverage or due to congestion, and to take different measures depending on the reason.

According to some embodiments, Admission Control may conditionally reject new requests for radio access bearers, requesting the same quality of service as the failed one for some period of time. The conditions may comprise: If failure of a certain quality of service requirement for a radio access bearer was due to bad coverage, the rejects may only affect the user equipment 120 associated with the failed quality of service radio access bearer; quality of service radio access bearer requests from other user equipment 120 may be admitted. However, if the failure to achieve the quality of service requirement is due to congestion, the rejects may only affect user equipment 120 asking for the same type of quality of service as the failed one and expected to run at the same or less important scheduling priority. This is herein referred to as a reactive approach.

However, other embodiments comprises a proactive approach for admission control, that optionally also may coexist with identifying out of coverage as a reason for quality of service failure. This proactive approach blocks in advance requests for quality of service radio access bearers, based on comparing load with an admission threshold. This is contrary to the reactive approach where blocking due to congestion starts first when any quality of service failure due to congestion has occurred.

In both the reactive and the proactive approach, congestion is addressed.

The rejects in case of congestion may be supported by another key aspect; alignment of the priorities used by the scheduler and the priorities used by Admission Control. When quality of service Supervision has detected a quality of service failure for a radio access bearer with a certain QCI, Admission Control may start to reject requests for radio access bearers asking for the same type of quality of service and expected to run at the same or less important scheduling priority. This way the rejects from Admission Control may reflect the load of scheduling since the priorities are aligned.

Thus according to embodiments of the method described herein, the admission or rejection of a requested radio access bearer may be based on whether the user equipment 120 of the requested radio access bearer is coverage limited or not. Thereby, less pointless admissions of quality of service radio access bearers to user equipment 120 which anyway cannot take advantage of the resource as they have insufficient coverage may be avoided, resulting in higher system capacity and more efficient use of resources.

Further, rejects may be based on quality of service congestion per QCI, so the rejects are more accurate i.e. unneeded rejects for non-congested QCIs may be avoided.

Not pre-emptable radio access bearers may never be pre-empted, but admission control may reject any more requested radio access bearers (pre-emptable and not pre-emptable alike) for the congested QCI, which improves the performance of the wireless communication system 100.

Figure 2:
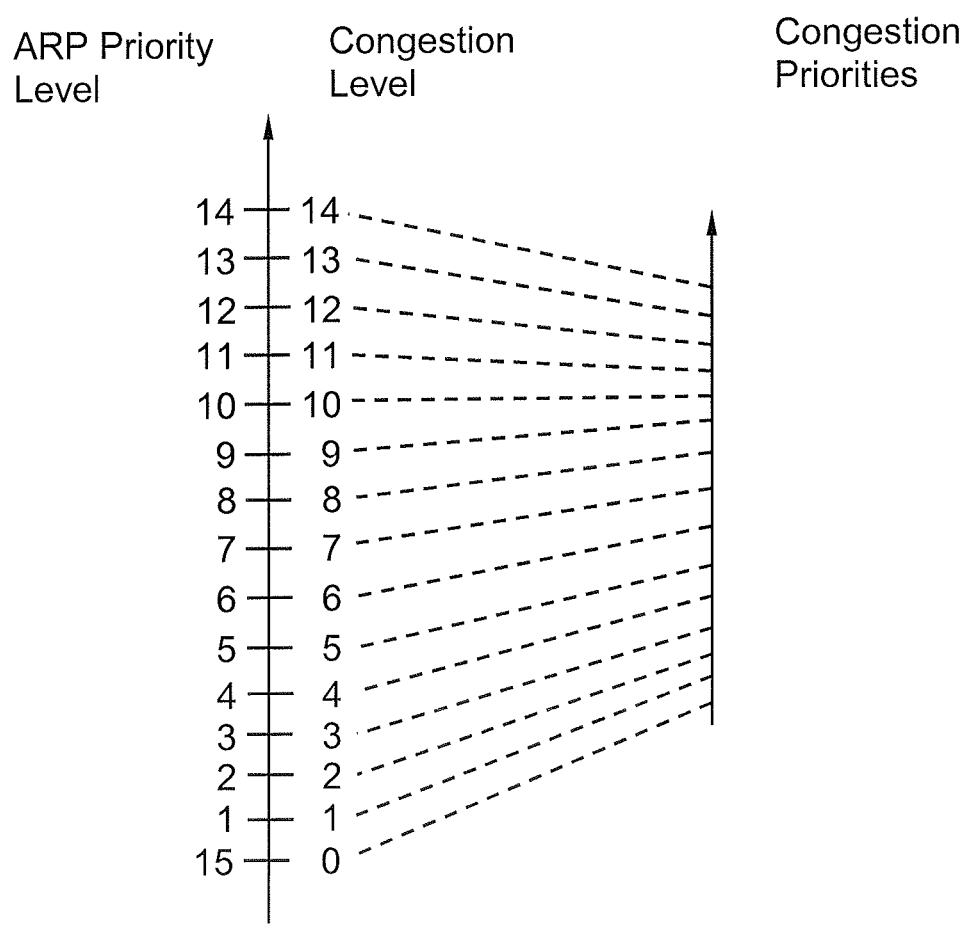
FIG. 2 is a schematic block diagram illustrating an example of priority levels.

FIG. 2 illustrates an example of mapping of priority level of a requested radio access bearer to a Congestion Level.

A calculated Congestion Level for each radio access bearer may be applied, that forms the basis for the priorities the Scheduler is using according to some embodiments. Further, these calculated Congestion Levels may be aligned with the behaviour of Admission Control. The mapping from Congestion Level to the priority in the Scheduler may be such that the order of Congestion Levels follows the order of priorities used by the Scheduler. A low Congestion Level corresponds to a low congestion priority, where a low value of priority corresponds to more important. Within one Congestion Level, the Scheduler priorities may be different but they may not extend into the neighbouring Congestion Levels.

According to the 3GPP Technical Standard (TS) 23.401 and/or TS 36.413, the Allocation and Retention Priority (ARP) Priority Level (PL) equals to 15 means the radio access bearer shall be considered not pre-emptable. There may be 15 Congestion Levels ranging from 0 to 14, according to some non-limiting embodiments, and they may be calculated as follows: Set Congestion Level equal to 0 if ARP priority level is equal to 15 or if ARP Pre-emption Vulnerability (PV) is equal to not pre-emptable; otherwise, set Congestion Level equal to ARP priority level.

It is reasonable to associate not pre-emptable bearers to the lowest level, which thus corresponds to the most prioritized category for allocation of resources, since they are expected to stay in the system regardless of pre-emption of other radio access bearers.

Figure 3A:
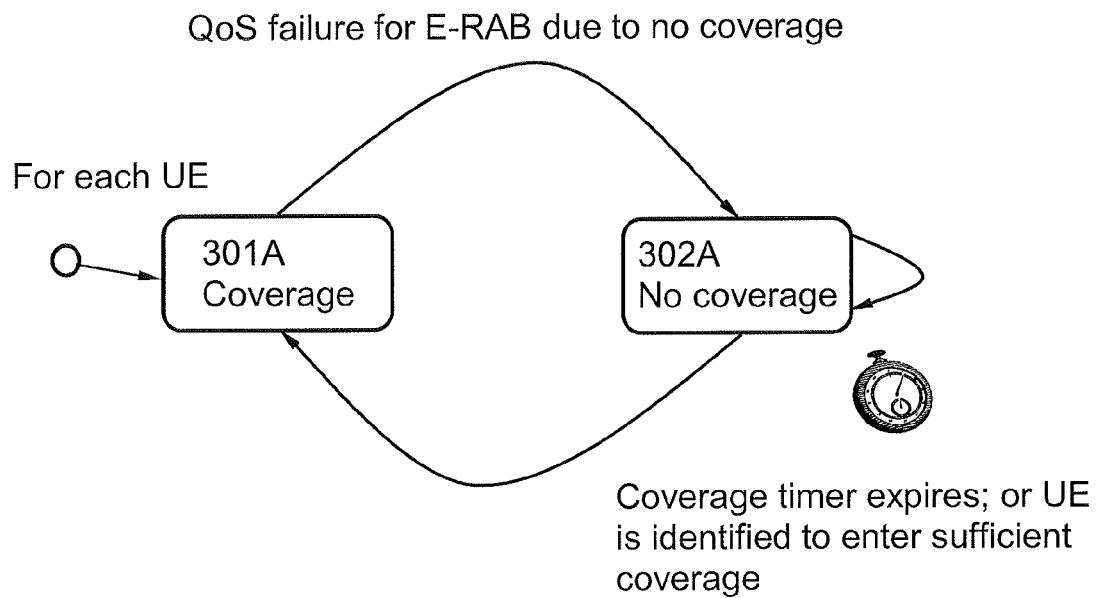
FIG. 3A is a schematic block diagram illustrating an example of coverage supervision and coverage states.

FIG. 3A illustrates an example of coverage monitoring according to some embodiments, comprising a finite-state machine for the states of coverage and non-coverage, respectively.

Each radio access bearer which has been given access by the network node 110 may be monitored, for checking whether the requested quality of service of the radio access bearer is fulfilled. Thereby, each radio access bearer may be consistently monitored. The monitoring may comprise monitoring the delay and indicate failure whenever the delay of the radio access bearer is consistently beyond its quality of service requirement. This may be an advantage in particular for delay sensitive services such as speech. When it is detected that the quality of service of the radio access bearer is not achieved, the radio access bearer may be pre-empted, unless the ARP setting do not allow the radio access bearer to be pre-empted.

For each user equipment 120 the number of Hybrid Automatic Repeat Request (HARQ) retransmissions may be continuously monitored over an observation period, according to some embodiments. Whenever the average of HARQ retransmissions reaches a threshold value and the quality of service requirement is not met the user equipment 120 may be considered to be coverage-limited in some embodiments.

When number of HARQ retransmissions is below the first threshold, the user equipment 120 may be considered to be in sufficient coverage.

Another possible way to supervise the radio link quality and/or to determine that the user equipment 120 is in a state of insufficient coverage may be based on Block Error Rate (BLER) statistics. If the average value of BLER is higher than a certain threshold value, BLERmax, the radio link may be considered to be in a state of insufficient coverage.

When the average value of BLER is below the second threshold, the user equipment 120 may be considered to be in sufficient coverage.

The monitoring, or coverage supervision, may be performed separately for both uplink and downlink in some embodiments. As long as one of the links has insufficient coverage, the user equipment 120 may be considered to be in a state of insufficient coverage. "Insufficient coverage" (or no coverage/bad coverage) in the context of this disclosure means a signal coverage of the user equipment 120 which is too bad to fulfil the quality of service requirements of the radio access bearer requested by, or associated with, the user equipment 120. The user equipment 120 may be considered to be in a state of insufficient coverage when the signal coverage is lower than a predetermined or configurable threshold level, for example.

When quality of service supervision has detected and concluded failed quality of service for a radio access bearer, there may be a check for insufficient coverage of the corresponding user equipment 120. If so, a state transition may be made for that particular user equipment 120, from the state of coverage into the state of no coverage, or insufficient coverage as may be the case. A coverage timer may be set according to some embodiments upon detection of failed quality of service due to insufficient coverage. After the coverage timer expires, or after the user equipment 120 has been identified to enter sufficient coverage as the case may be, the user equipment 120 may return to the state Coverage in some embodiments, see FIG. 3A.

It may be noted that in LTE the substantial parts of the user equipment context remains, even after the quality of service radio access bearer has been pre-empted. It is therefore doable for the network node 110 to register the coverage-related states in this user equipment context.

Further the network node 110 may deny access for any user equipment 120 in No Coverage state to establish a radio access bearer. Other user equipments may be admitted.

Figure 3B:
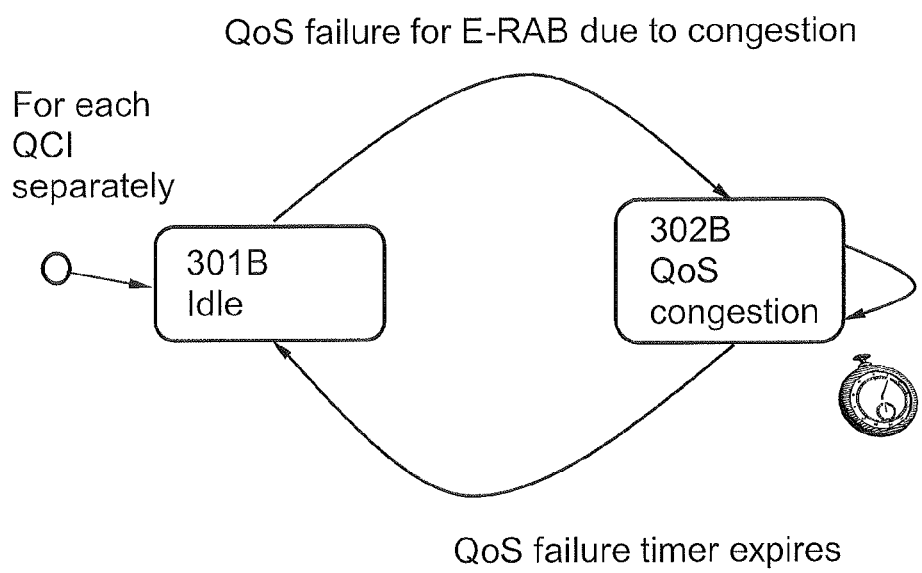
FIG. 3B is a schematic flow chart illustrating an example of QoS supervision and congestion states.

Dealing with quality of service failure due to congestion of the radio access bearer may be done either in a reactive or in a proactive sense, in different embodiments, as will be further discussed in conjunction with FIG. 3B.

FIG. 3B illustrates an example of congestion monitoring according to some embodiments, comprising a finite-state machine for the states of congestion and no congestion, respectively.

The reactive approach comprises blocking requests for radio access bearers, due to congestion first when a quality of service failure due to congestion has occurred. When quality of service failure occurs without any indication of insufficient coverage, congestion may be concluded. Therefore, a state transition may be made from a non-congested state (Idle) to a congested state (Congestion) if not already in this state. At this transition, the Congestion Level for the radio access bearer is calculated given the ARP. In transitions to the state Congestion, the failing radio access bearer may be pre-empted if pre-emptable and if pre-emption is appropriate for the quality of service Class Identifier (QCI) of the radio access bearer. For transitions from Idle to Congestion, the Congestion Level of the failing radio access bearer may be stored as a quality of service Blocking Level in some embodiments. For self-transitions from Idle to Idle, the Congestion Level of the failing radio access bearer may be stored as a quality of service Blocking Level if it is lower than the previously stored quality of service Blocking Level. For all transitions triggered by quality of service Failure a quality of service Failure Timer may be started/restarted. When this timer expires, there may be a transition to state Idle in some embodiments.

See FIG. 3B for a diagram of the quality of service Supervision states. Note there is one such diagram for each QCI. This is to capture the aspect that quality of service congestion for one QCI does not necessarily indicate Congestion for another QCI. An example may comprise when two QCIs are assigned the same scheduling priorities but different delay requirements. In addition, if scheduling considers channel quality this aspect may be differently distributed among the QCIs.

According to embodiments based on the proactive approach, the resources handled by the Scheduler comprised in the network node 110 may be monitored. The Scheduler may assign these resources according to its congestion priorities which in turn are in order of Congestion levels. The resource usage by quality of service radio access bearers monitored per congestion level may be denoted U(C).

The proactive approach admits or blocks a request for a quality of service radio access bearer given its calculated congestion level and given the resource usage U(C) from already admitted quality of service radio access bearers, e.g. in the following way: the congestion level (C-candidate), or rather the expected congestion level, of the requested radio access bearer may be calculated. Then, the resource usage U(C) from the already admitted quality of service radio access bearers may be summed up, but, according to some embodiments only for radio access bearers having a congestion level C not exceeding the expected congestion level C-candidate of the requested radio access bearer. That sum of the resource usage of the already admitted quality of service radio access bearers may be denoted S (C-candidate).

Figure 5A:
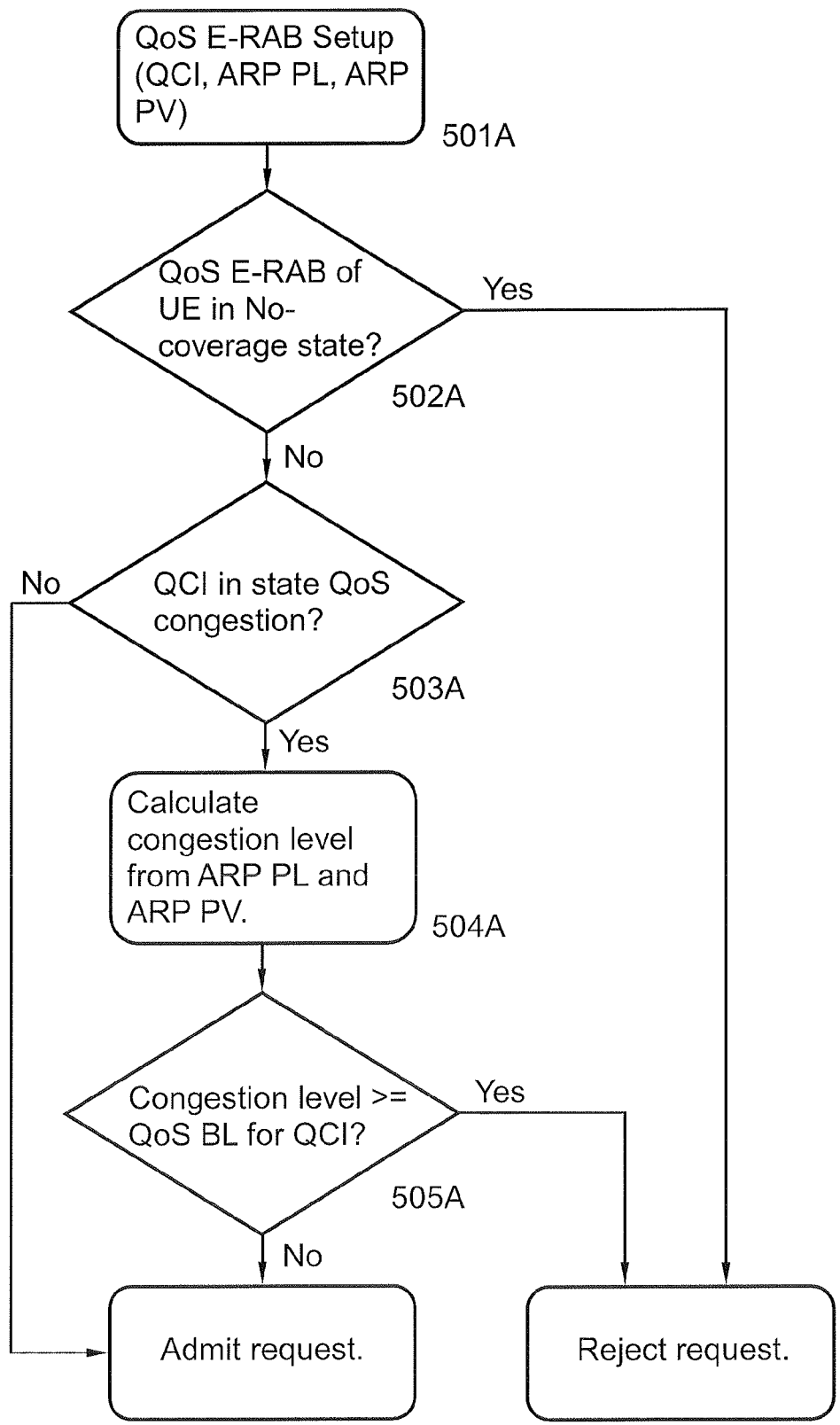
FIG. 5A is a schematic flow chart illustrating examples of actions comprised in embodiments of the method in a network node.
Figure 5B:
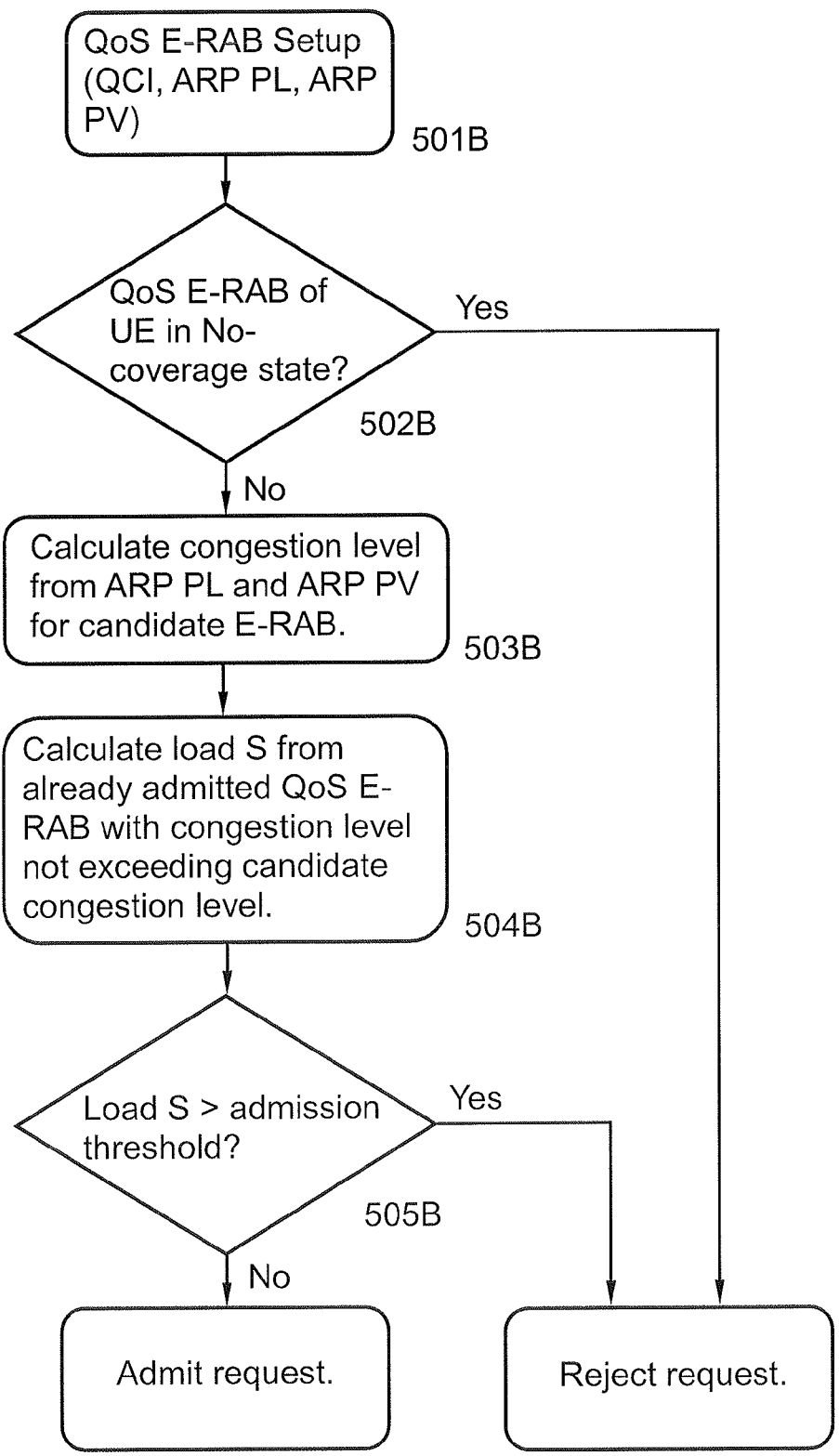
FIG. 5B is a schematic flow chart illustrating examples of actions comprised in embodiments of the method in a network node.

The flow chart for the admission control procedure in an embodiment using the proactive approach is shown in FIG. 5B.

However, according to some embodiments based on the reactive approach, the input of the Admission Control of the network node 110 may comprise quality of service supervision state and the quality of service blocking level for each QCI, according to some embodiments. It may also comprise the coverage state of all the user equipments 120 administrated by the network node 110.

According to embodiments herein, the admission control may check, e.g. when receiving a request for a radio access bearer, check whether the user equipments 120 associated with the requested radio access bearer is in state of insufficient coverage, in order to reject the user equipment 120. Otherwise the user equipment 120 may be admitted if it is in quality of service supervision state Idle for the QCI of the radio access bearer. If the user equipment 120 is not in Idle state, admission control may admit the request if Congestion Level is lower than the quality of service blocking level for the QCI of the radio access bearer in some embodiments. Otherwise, Admission Control may reject the request for the radio access bearer.

For the case of congestion, the idea is to reject based on both QCI and ARP (Congestion Level), since quality of service requirements for different QCIs may be different or even so that some QCIs does not come with any quality of service requirement at all, to be served at a best-effort basis. Therefore, it may be overly aggressive to reject radio access bearers for all QCIs because of a quality of service failure, according to some embodiments.

The flow chart for the Admission Control procedure in an embodiment using the reactive approach is shown in FIG. 5A.

Figure 4:
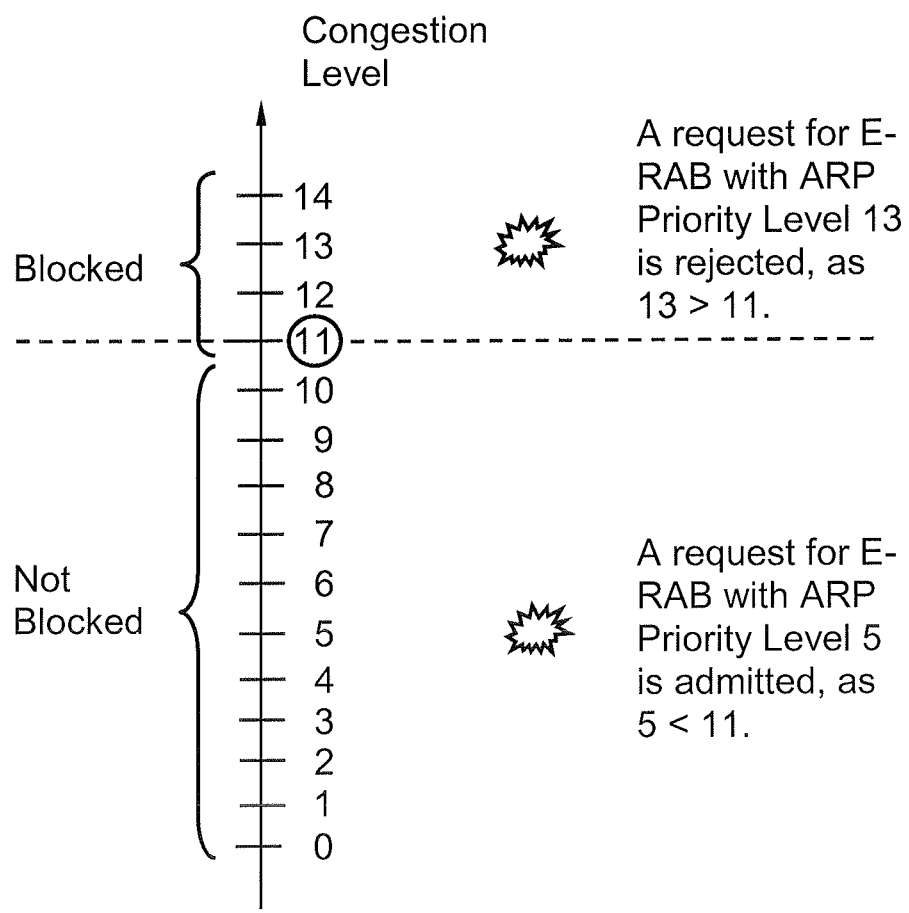
FIG. 4 is schematically illustrating Admission Control in a wireless communication system according an embodiment.

FIG. 4 illustrates an example of a scenario according to an embodiment of the method for Admission Control.

According to the illustrated embodiment, all QCIs may be known by the network node 110 to be in quality of service Supervision State Idle. A quality of service failure appears according to quality of service Supervision for a pre-emptable radio access bearer with QCI X and ARP priority level 11. It is to be noted that the congestion level, or ARP priority level of 11 is merely an example. Quality of service Supervision pre-empts the radio access bearer (since it was pre-emptable) and starts a quality of service Failure timer related to QCI X. Until the timer expires, all radio access bearers with QCI X and ARP priority level above or equal to 11, i.e. less or equally prioritized than the pre-empted radio access bearer may be rejected. Radio access bearers with QCI different than X may be admitted in this particular example.

FIG. 5A illustrates a flow chart of an example of Admission Control based on the reactive approach, which previously has been discussed.

The herein described method may be exemplified in the following non-limiting descriptions of different embodiments, as illustrated in subsequent FIGS. 5A-5B, which are provided in order to give a general overview of different embodiments of the method for Admission Control, as well as to mirror the versatility and multitude of the method.

In the alternative embodiment illustrated in FIG. 5A, the tendency to admit or reject may depend on both the quality of service Supervision state for the QCI of the radio access bearer seeking admission and the coverage state of the user equipment 120 to which the quality of service radio access bearer belongs. Any, some or all of the following actions 501A-505A may be comprised according to different embodiments:

Action 501A

The network node 110 receives a request for a quality of service radio access bearer from the user equipment 120. Upon receiving the request, the network node 110 may extract further information such as QCI, ARP priority level of the radio access bearer, and/or pre-emption vulnerability of the requested radio access bearer, i.e. if it is allowed to be pre-empted or not. Further, the user equipment 120 that the radio access bearer belongs to may be identified.

Action 502A

A check may be performed, checking whether the requested quality of service radio access bearer belongs to a user equipment 120 which is in a state of no coverage, or insufficient coverage, or having a coverage which is below a threshold level. If the user equipment 120 does not have coverage, the request may be rejected. Otherwise, action 503A may be performed.

Action 503A

A check may be performed, checking whether the QCI of the requested quality of service radio access bearer is in a state of congestion, or is suffering from congestion above a threshold level. If it is not, the request for the radio access bearer may be admitted. Otherwise, action 504A may be performed.

Action 504A

When the QCI of the requested quality of service radio access bearer is in a state of congestion, the Congestion Level may be calculated from the ARP Priority Level and/or Pre-emption Vulnerability of the radio access bearer.

Action 505A

A check may be performed, based on the calculated congestion level. When the calculated congestion level of the requested radio access bearer is equal to, or exceeding the quality of service blocking level for the particular QCI, the request may be rejected. Otherwise, when the calculated congestion level of the requested radio access bearer is below the quality of service blocking level for the QCI, the request may be admitted.

FIG. 5B illustrates a flow chart of an example of Admission Control based on the proactive approach, which previously has been discussed.

According to the embodiment of FIG. 5B, the tendency to admit or reject depends on both the load and the coverage state of the user equipment 120 to which the quality of service radio access bearer belongs.

For the embodiment illustrating a proactive approach of Admission Control, there may first be a check for the coverage state of the user equipment 120, just as in the above described embodiment based on the reactive approach, see FIG. 5A. If the user equipment 120 is in a state of no coverage/insufficient coverage/coverage below a threshold level, the request for radio access bearer is rejected. If not, the load of the requested radio access bearer is estimated and compared with a configurable admission threshold level. Whenever the estimated load of the requested radio access bearer exceeds the threshold level, the quality of service radio access bearer request is rejected.

Any, some or all of the following actions 501B-505B may be comprised according to different embodiments:

Action 501B

The network node 110 receives a request for a quality of service radio access bearer from the user equipment 120. Upon receiving the request, the network node 110 may extract further information such as QCI, ARP priority level of the radio access bearer, and/or pre-emption vulnerability of the requested radio access bearer, i.e. if it is allowed to be pre-empted or not. Further, the user equipment 120 that the radio access bearer belongs to may be identified.

Action 502B

A check may be performed, checking whether the requested quality of service radio access bearer belongs to a user equipment 120 which is in a state of no coverage, or insufficient coverage, or having a coverage which is below a threshold level. If the user equipment 120 does not have coverage, the request may be rejected. Otherwise, action 503B may be performed.

Action 503B

The congestion level of the candidate radio access bearer may be calculated from the ARP Priority Level and/or Pre-emption Vulnerability of the radio access bearer.

Action 504B

The load of already admitted quality of service radio access bearers, which are administrated by the network node 110, having a congestion level which is smaller (i.e. which are more prioritized) than, or equal to, the congestion level of the candidate radio access bearer is summed.

Action 505B

A comparison may then be made between the summed load of already admitted quality of service radio access bearers having a congestion level which is smaller (i.e. which are more prioritized) than, or equal to, the congestion level of the candidate radio access bearer and an admission threshold level. When the sum of the loads of the already admitted quality of service radio access bearers exceeds the admission threshold level, the request for the radio access bearer may be rejected. Otherwise, when the sum of the loads of the already admitted quality of service radio access bearers is below the admission threshold level, the request for the radio access bearer may be admitted.

Figure 6:
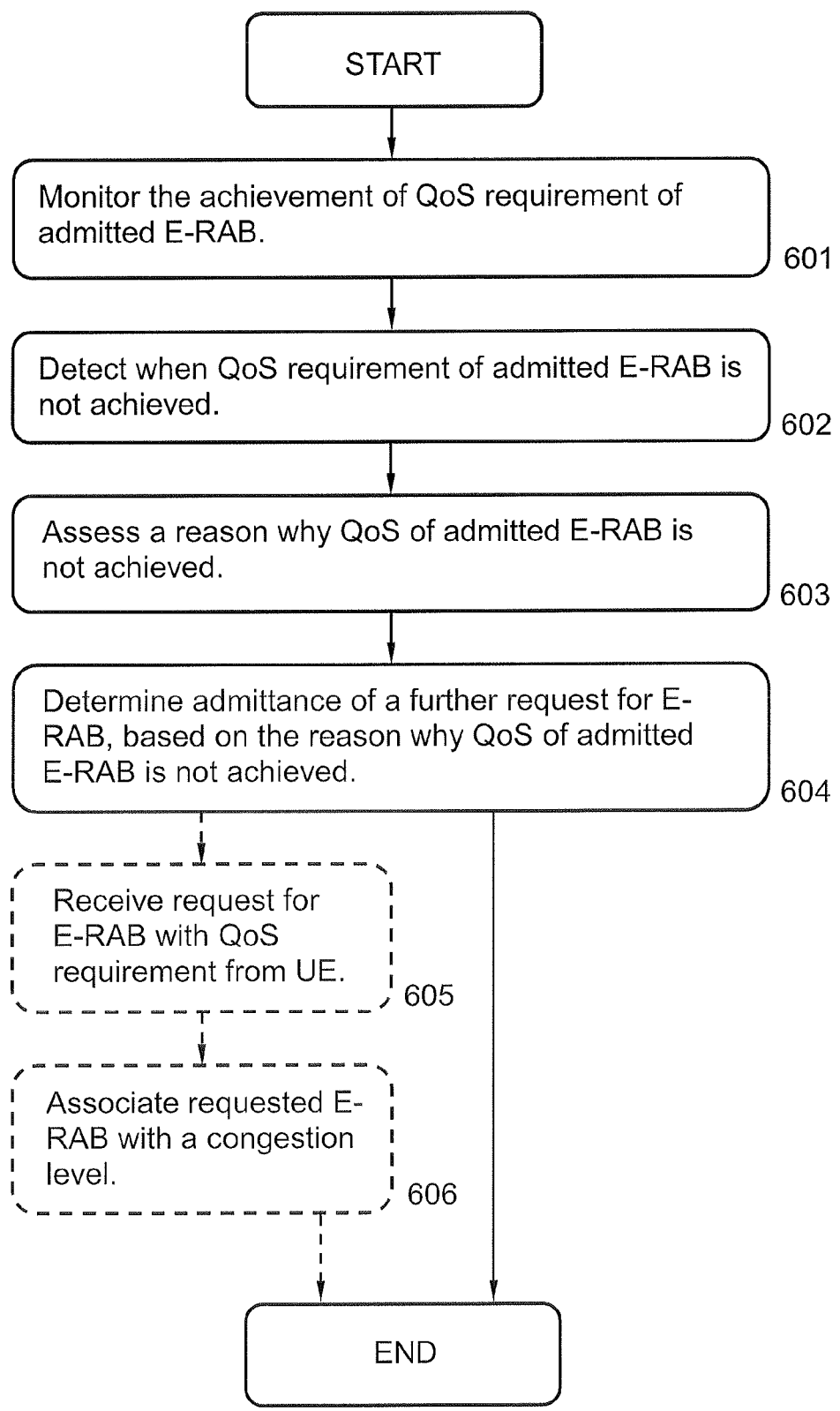
FIG. 6 is a schematic flow chart illustrating examples of actions comprised in embodiments of the method in a network node.

FIG. 6 is a flow chart illustrating embodiments of a method 600 for use in a network node 110 in a wireless communication system 100. The network node 110, in which the method is to be performed, is serving a cell 115, in which a user equipment 120 is situated. The method 600 aims at performing admission control of a request for a radio access bearer to be received from the user equipment 120. The network node 110 is further configured not only to admit and/or reject requests for radio access bearers, but also for administration, monitoring and possibly pre-emption of already admitted radio access bearers.

The wireless communication system 100 may be based on Long-Term Evolution (LTE) within the Third Generation Partnership Project (3GPP) according to some embodiments, wherein the network node 110 may comprise a macro base station such as e.g. an Evolved Node B.

To appropriately perform admission control, the method 600 may comprise a number of actions 601-606.

It is however to be noted that any, some or all of the described actions, may be performed in a somewhat different chronological order than the enumeration indicates, or even be performed simultaneously. Also, it is to be noted that some of the actions such as e.g. 605 and/or 606 may be performed within some alternative embodiments, as is indicated by dashed lines in FIG. 6. The method 600 may comprise the following actions:

Action 601

The achievement of quality of service requirement of an already admitted radio access bearer is monitored.

The monitoring may also be referred to as quality of service supervision, and may comprise a comparison between the requested quality of service requirement of the admitted radio access bearer and the actually achieved quality of service of the admitted radio access bearer.

In some embodiments, the respective quality of service requirement of all already admitted radio access bearers may be monitored in parallel.

Action 602

It is detected when the quality of service requirement of the admitted radio access bearer is not achieved, as a result of the monitoring performed according to action 601.

The detection may comprise notifying that the actually achieved quality of service of the admitted radio access bearer is lower than the requested quality of service requirement of the admitted radio access bearer.

Action 603

A reason why the quality of service of the admitted radio access bearer is not achieved is assessed. Thus an assessment of the reason for a failure of achieving the requested quality of service is performed upon detecting such failure.

The reason why the quality of service of the admitted radio access bearer is not achieved may comprise any of insufficient coverage of the user equipment 120 of the admitted radio access bearer, or congestion of the admitted radio access bearer.

The assessment of the reason why the quality of service of the admitted radio access bearer is not achieved may comprise, in some embodiments, to identify a user equipment 120 associated with the radio access bearer not achieving requested quality of service requirement, and to detect that the user equipment 120 is in a state of insufficient coverage.

When it is detected that the quality of service requirement of the admitted radio access bearer is not achieved, the assessment of the reason for it may comprise detecting when a number of Hybrid Automatic Repeat Request (HARQ) retransmissions between the network node 110 and the user equipment 120 within an observation period exceeds a first threshold value, according to some embodiments.

However, according to some embodiments, when it is detected that the quality of service requirement of the admitted radio access bearer is not achieved, the state of insufficient coverage of the user equipment 120 may be detected when an average value of a block error rate for transmissions between the network node 110 and the user equipment 120, measured within an observation period exceeds a second threshold value.

Further, in some of the above described embodiments, the number of retransmissions and/or measurement of error rate respectively, may be made separately both for uplink and downlink. The user equipment 120 may then be determined to be in a state of insufficient coverage when any of the threshold values in any of the links is exceeded.

Further, it may be determined that the admitted radio access bearer is in a state of congestion, when the user equipment 120, associated with the admitted radio access bearer is in a state of coverage, while it is detected that the quality of service requirement of the admitted radio access bearer is not achieved, according to some embodiments.

Action 604

Admittance of a further request for radio access bearer is determined, based on the reason why the quality of service of the admitted radio access bearer is not achieved.

The admittance may comprise, in case of insufficient coverage of the user equipment 120, rejecting the further request for radio access bearer, received from that user equipment 120. In case of congestion of the admitted radio access bearer, the admittance may comprise rejecting a request for radio access bearer of the same quality of service and the same or less important priority as the admitted radio access bearer.

The admittance may comprise admitting the request for the radio access bearer, e.g. if no failure of quality of service of any admitted radio access bearer has been detected, according to some embodiments.

According to some embodiments, it may be determined to reject any further request for radio access bearer with a quality of service requirement, received from the user equipment 120 detected to be in a state of insufficient coverage.

However, according to some embodiments, a first blocking timer 730 may be set, when it is detected that the quality of service requirement of the admitted radio access bearer is not achieved because the associated user equipment 120 is in a state of insufficient coverage. According to those embodiments, the determination of admittance may comprise rejecting any further request for a further radio access bearer having a quality of service requirement, received from the user equipment 120 which is associated with the radio access bearer not achieving its quality of service requirement, before the first blocking timer 730 expires, or until the user equipment 120 has been identified to enter sufficient coverage.

The first blocking timer 730 may be set, or started at a point in time when the user equipment 120 has been determined to be in a state of insufficient coverage. In some embodiments, the first blocking timer 730 may be set when the user equipment 120 swap from coverage state to no coverage state. However, according to some embodiments, the first blocking timer 730 may be set at any other arbitrary point in time when it is detected that the user equipment 120 is in a state of insufficient coverage, according to some embodiments.

Further, according to some embodiments wherein it has been determined that the admitted radio access bearer is in a state of congestion, it may be determined to reject any further request for any radio access bearer having the same quality of service requirement as the congested radio access bearer, and which is expected to run at a congestion level which is less or equally prioritized by the scheduler than the congestion level of the congested radio access bearer.

Further, a second blocking timer 735 may be set, upon detecting that the quality of service requirement of the admitted radio access bearer is not achieved because of congestion, according to some embodiments. Thereafter, any further request for any radio access bearer having the same quality of service requirement as the congested radio access bearer, and which is expected to run at a congestion level which is less or equally prioritized by the scheduler than the congestion level of the congested radio access bearer may be rejected, when the request is received before the second blocking timer 735 expires according to some embodiments.

The second blocking timer 735 may be set, or started at a point in time when the user equipment 120 has been determined to be in a state of congestion. In some embodiments, the second blocking timer 735 may be set when the user equipment 120 swap from no-congestion state to congestion state. However, according to some embodiments, the second blocking timer 735 may be set at any other arbitrary point in time when it is detected that the user equipment 120 is in a state of congestion, according to some embodiments.

Furthermore, in embodiments when it is detected that the quality of service requirement of the admitted radio access bearer is not achieved while the user equipment 120 is determined to be in coverage, the congestion level of the admitted radio access bearer may be calculated based on an Allocation and Retention Priority (ARP) and wherein the calculated congestion level of the admitted radio access bearer may be stored as a quality of service blocking level for the quality of service requirement of the admitted radio access bearer when it is below any previously stored quality of service blocking level.

According to some such embodiments, a calculation of congestion level of a further radio access bearer requested by a user equipment 120 may be made based on an Allocation and Retention Priority (ARP) and compared with a stored quality of service blocking level, and wherein the request may be rejected when the calculated congestion level exceeds the stored quality of service blocking level.

Furthermore, according to embodiments wherein it is detected that the quality of service requirement of the admitted radio access bearer is achieved, the action of determining may further comprise computing a load due to admitted radio access bearers, and comparing the computed load with an admission threshold value, and rejecting any further request for radio access bearer, when the computed load exceeds the admission threshold level.

According to some of those embodiments, the load due to admitted radio access bearers may be computed by calculating the congestion level of the requested radio access bearer, computing resource usage of admitted radio access bearers, having a congestion level below or equal to the calculated congestion level of the requested radio access bearer, and comparing the computed resource usage to a threshold level.

Additionally, according to some embodiments, the action of determining admittance of a further request may be based on an associated congestion level, and where the scheduler may prioritize congestion levels with lower values more than congestion levels with higher values. However, embodiments directed towards the opposite situation may be envisioned according to alternative embodiments.

Action 605

This action may be comprised within some alternative embodiments, but not necessarily within all embodiments of the method 600.

A request for a radio access bearer with a quality of service requirement may be received from a user equipment 120.

Action 606

This action may be comprised within some alternative embodiments, but not necessarily within all embodiments of the method 600.

The requested radio access bearer may be associated with a congestion level, wherein the congestion level may be set to 0 when the ARP of the requested radio access bearer corresponds to a setting when the radio access bearer is not pre-emptable. Otherwise, when the radio access bearer is pre-emptable, the congestion level may be set equal to the ARP Priority Level of the radio access bearer, according to some embodiments.

The congestion level associated with the requested radio access bearer may then be utilized for implementing the established admission control.

Figure 7:
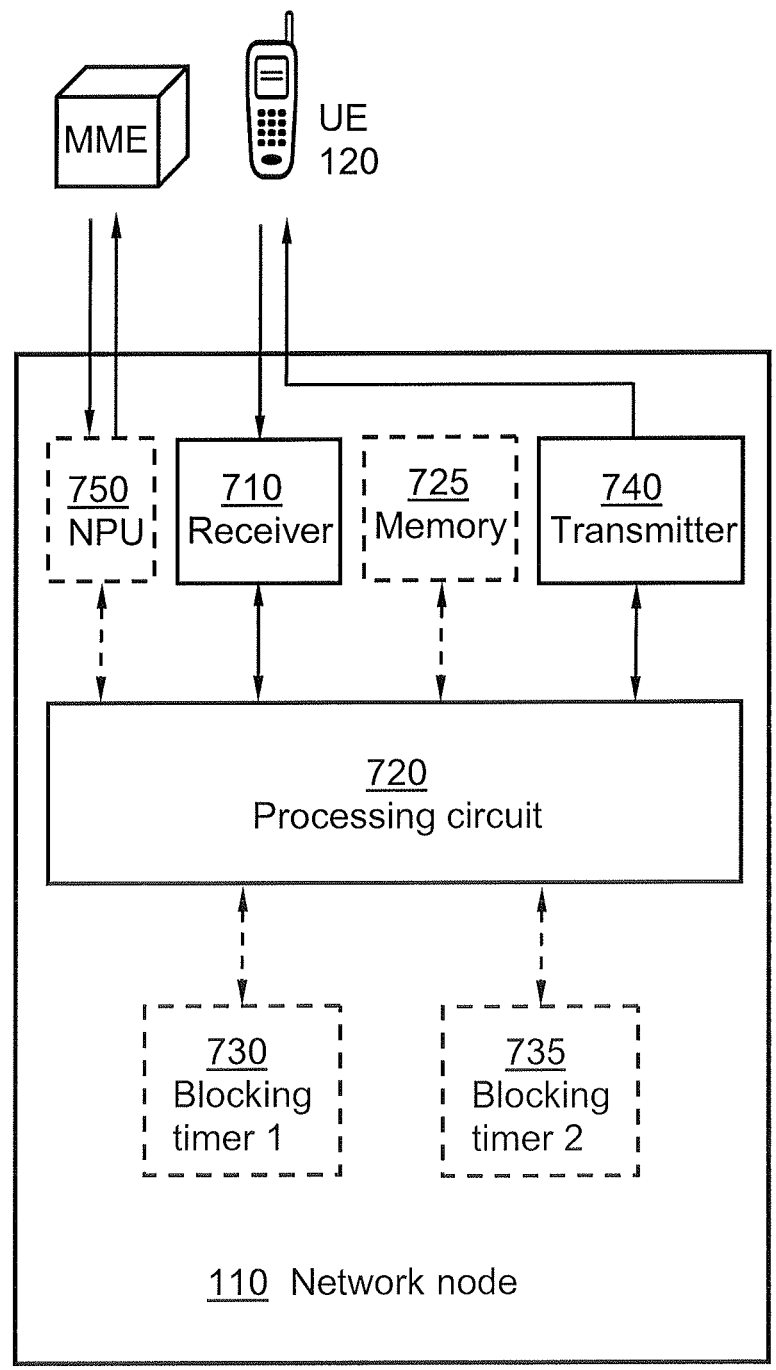
FIG. 7 is a schematic block diagram illustrating an example of an embodiment of a network node.

FIG. 7 is a block diagram illustrating a network node 110 configured for admission control of future requests for radio access bearers, to be received from a user equipment 120. The network node 110 is configured to perform any, some or all of the actions 601-606 for admission control of requests for radio access bearers. Dashed line is used to illustrate units comprised in some alternative embodiments.

For enhanced clarity, any internal electronics or other components of the network node 110, not completely indispensable for understanding the herein described embodiments has been omitted from FIG. 7.

The network node 110 comprises a processing circuit 720, configured to monitor achievement of quality of service requirement of an admitted radio access bearer. The processing circuit 720 is also configured to detect when the quality of service requirement of the admitted radio access bearer is not achieved. Further, the processing circuit 720 is in addition configured to assess a reason why the quality of service of the admitted radio access bearer is not achieved. Additionally, the processing circuit 720 is furthermore configured to determine admittance of further request for radio access bearer, based on the reason why the quality of service of the admitted radio access bearer is not achieved.

The reason why the quality of service of the admitted radio access bearer is not achieved may comprise any of insufficient coverage of the user equipment 120 of the admitted radio access bearer, or congestion of the admitted radio access bearer. The processing circuit 720 may be further configured to, in case of insufficient coverage of the user equipment 120, reject further request for radio access bearers from that user equipment 120. Additionally, in case of congestion of the admitted radio access bearer, the processing circuit 720 may additionally be configured to reject further request for radio access bearer of the same quality of service and the same or less important priority as the admitted radio access bearer.

According to some embodiments, the processing circuit 720 may also be configured to identify a user equipment 120 associated with the radio access bearer not achieving requested quality of service requirement. The processing circuit 720 may in addition be configured to detect that the user equipment 120 is in a state of insufficient coverage. Furthermore, the processing circuit 720 may be configured to reject any further request for radio access bearers with a quality of service requirement, received from the user equipment 120 detected to be in a state of insufficient coverage.

The network node 110 may further comprise a first blocking timer 730. According to such embodiments, the processing circuit 720 may be further configured to set the first blocking timer 730 when it is detected that the quality of service requirement of the admitted radio access bearer is not achieved because the associated user equipment 120 is in a state of insufficient coverage. Also, the processing circuit 720 may be further configured to reject any further request for a further radio access bearer having a quality of service requirement, received from the user equipment 120 which is associated with the radio access bearer not achieving its quality of service requirement, before the first blocking timer 730 expires or until the user equipment 120 has been identified to enter sufficient coverage.

The first blocking timer 730 may be configured to measure the time the user equipment 120 is in a state of insufficient coverage, or at least a minimum time the user equipment 120 is in a state of insufficient coverage. The first blocking timer 730 may comprise e.g. a countdown timer, a stop watch timer, a watch dog timer according to different embodiments.

The network node 110 may further comprise a transmitter 740, configured to transmit a radio signal to be received by the user equipment 120. The network node 110 may further comprise a receiver 710, configured to receive a radio signal transmitted by the user equipment 120. According to at least some such embodiments, the processing circuit 720 may be further configured to, upon detecting that the quality of service requirement of the admitted radio access bearer is not achieved, detect the state of insufficient coverage of the user equipment 120 when a number of Hybrid Automatic Repeat Request (HARQ) retransmissions between the network node 110 and the user equipment 120 within an observation period exceeds a first threshold level.

However, according to some embodiments wherein the network node 110 comprises a transmitter 740, configured to transmit a radio signal to be received by the user equipment 120, the processing circuit 720 may be configured to, upon detecting that the quality of service requirement of the admitted radio access bearer is not achieved, detect the state of insufficient coverage of the user equipment 120 when an average value of a block error rate for transmissions between the network node 110 and the user equipment 120, measured within an observation period exceeds a second threshold level.

The processing circuit 720 may be configured to measure the number of retransmissions and/or perform measurement of error rate respectively, separately both for uplink and downlink. Further, the processing circuit 720 may be configured to determine that the user equipment 120 is in a state of insufficient coverage when any of the threshold levels in any of the links is exceeded.

The processing circuit 720 may additionally be configured to determine that the admitted radio access bearer is in a state of congestion, when the user equipment 120, associated with the admitted radio access bearer is in a state of coverage, while it is detected that the quality of service requirement of the admitted radio access bearer is not achieved. According to at least some such embodiments, the processing circuit 720 also may reject any further request for any radio access bearer having the same quality of service requirement as the congested radio access bearer, and which is expected to run at a congestion level which is less or equally prioritized by the scheduler than the congestion level of the congested radio access bearer.

The network node 110 may also comprise a second blocking timer 735, according to some embodiments. The processing circuit 720 may additionally be configured to set the second blocking timer 735 upon detecting that the quality of service requirement of the admitted radio access bearer is not achieved. Also, the processing circuit 720 may be configured also to reject further request for any radio access bearer having the same quality of service requirement as the congested radio access bearer, and which is expected to run at a congestion level which is less or equally prioritized by the scheduler than the congestion level of the congested radio access bearer, when the request is received before the second blocking timer 735 expires, according to some embodiments.

The second blocking timer 735 may be configured to measure the time the radio access bearer is in a state of congestion, or at least a minimum time the radio access bearer is in a state of congestion. The second blocking timer 735 may comprise e.g. a countdown timer, a stop watch timer, a watch dog timer according to different embodiments.

Furthermore, the processing circuit 720 may be configured to, when it is detected that the quality of service requirement of the admitted radio access bearer is not achieved while the user equipment 120 is determined to be in coverage, calculate the congestion level of the admitted radio access bearer, based on an Allocation and Retention Priority (ARP).

The network node 110 may comprise at least one memory 725. The memory 725 may comprise a physical device utilized to store data or programs i.e. sequences of instructions, on a temporary or permanent basis. According to some embodiments, the memory 725 may comprise integrated circuits comprising silicon-based transistors.

Further, the memory 725 may be volatile or non-volatile. The network node 110 may further according to some embodiments comprise both a volatile memory 725 and also at a non-volatile memory 725.

Furthermore, the processing circuit 720 may be configured to store the calculated congestion level of the admitted radio access bearer in the memory 725 as a quality of service blocking level for the quality of service requirement of the admitted radio access bearer when it is below any previously stored quality of service blocking level according to alternative embodiments.

The processing circuit 720 may in addition be configured to calculate congestion level of a further radio access bearer requested by the user equipment 120, based on an ARP, and also configured to compare it with a stored quality of service blocking level corresponding to the quality of service requirement of the radio access bearer. The processing circuit 720 may also be configured to reject the request for the further radio access bearer when the calculated congestion level exceeds the stored quality of service blocking level according to some embodiments.

The processing circuit 720 may alternatively also be configured to, upon detecting that the quality of service requirement of the admitted radio access bearer is achieved, compute a load due to admitted radio access bearers. According to some such embodiments, the processing circuit 720 may also be configured to compare the computed load with an admission threshold level, and configured to reject any further request for radio access bearer, when the computed load exceeds the admission threshold level.

The processing circuit 720 may optionally be configured to calculate the congestion level of the requested radio access bearer. Further, the processing circuit 720 may be configured to compute resource usage of admitted radio access bearers, having a congestion level below, or equal to, the calculated congestion level of the requested radio access bearer, and to compare the computed resource usage to a threshold level, according to some embodiments.

The network node 110 may further comprise a Network Processing Unit 750 (NPU), configured to receive a request for a radio access bearer with a quality of service requirement from a control node in the network. The control node may be represented by e.g. a Mobility Management Entity (MME), in case of LTE.

The processing circuit 720 may in some embodiments be configured to associate the requested radio access bearer with a congestion level, wherein the congestion level is set to 0 when the ARP of the radio access bearer corresponds to a setting when the radio access bearer is not pre-emptable, otherwise, the congestion level is set equal to the ARP Priority Level of the radio access bearer. The processing circuit 720 may further be configured to determine accessibility of the received request based on the associated congestion level, and where the scheduler prioritizes congestion levels with lower values more than congestion levels with higher values.

The processing circuit 720 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as e.g. any, some or all of the ones enumerated above.

The processing circuit 720 may further perform data processing functions for inputting, outputting, and processing of data comprising data buffering and device control functions, such as call processing control, user interface control, or the like.

Further, it is to be noted that some of the described units 710-750 comprised within the network node 110 in the wireless communication system 100 are to be regarded as separate logical entities but not with necessity separate physical entities. To mention just one example, the receiver 710 and the transmitter 740 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 110, and the user equipment 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 601-606 to be performed in the network node 110 may be implemented through one or more processing circuits 720 in the network node 110, together with computer program code for performing the functions of the present actions 601-606. Thus a computer program product, comprising instructions for performing the actions 601-606 in the network node 110 may perform admission control of a request for a radio access bearer to be received from a user equipment 120, when the computer program code is loaded into the one or more processing circuits 720.

The computer program product mentioned above may be provided for instance in the form of a data carrier carrying computer program code for performing at least some of the actions 601-606 according to some embodiments when being loaded into the processing circuit 720. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the network node 110 remotely, e.g. over an Internet or an intranet connection.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method in a network node for admission control of a request for a radio access bearer to be received from a user equipment, the method comprising:
   monitoring achievement of quality of service requirement of an admitted radio access bearer, wherein the admitted radio access bearer is a radio interface between the network node and the user equipment, and wherein the monitoring includes monitoring a delay of the admitted radio access bearer;
   detecting that a quality of service requirement of the admitted radio access bearer is not achieved based on the delay of the admitted radio access bearer being beyond the quality of service requirement;
   assessing a reason why the quality of service requirement of the admitted radio access bearer is not achieved, wherein the reason is one or more of:
      insufficient coverage of the user equipment of the admitted radio access bearer, and
      congestion of the admitted radio access bearer; and
   determining admittance of a further request for radio access bearer, based on the reason why the quality of service requirement of the admitted radio access bearer is not achieved, wherein the determining admittance comprises, in case of congestion of the admitted radio access bearer, allowing the further request for radio access bearer of a higher quality of service than that of the admitted radio access bearer.

2. The method according to claim 1,
wherein the determining admittance further comprises,
   in case of insufficient coverage of the user equipment, rejecting the further request for radio access bearer, received from that user equipment, and,
   in case of congestion of the admitted radio access bearer, rejecting the further request for radio access bearer of a same quality of service and a same or less important priority as the admitted radio access bearer.

3. The method according to claim 1,
wherein the assessing comprises
   identifying the user equipment associated with the admitted radio access bearer not achieving the quality of service requirement,
   detecting that the user equipment is in a state of insufficient coverage, and
wherein the determining comprises
   rejecting any further request for radio access bearer with a quality of service requirement, received from the user equipment detected to be in the state of insufficient coverage.

4. The method according to claim 1, wherein the determining comprises:
   setting a first blocking timer when it is detected that the quality of service requirement of the admitted radio access bearer is not achieved because the user equipment being associated is in a state of insufficient coverage; and
   rejecting any further request for a further radio access bearer having a quality of service requirement, received from the user equipment which is associated with the radio access bearer not achieving its quality of service requirement, before the first blocking timer expires, or before the user equipment has been identified to enter sufficient coverage.

5. The method according to claim 1, wherein, when it is detected that the quality of service requirement of the admitted radio access bearer is not achieved, a state of insufficient coverage of the user equipment is detected when a number of Hybrid Automatic Repeat Request (HARQ) retransmissions between the network node and the user equipment within an observation period exceeds a first threshold level.

6. The method according to claim 1, wherein, when it is detected that the quality of service requirement of the admitted radio access bearer is not achieved, the state of insufficient coverage of the user equipment is detected when an average value of a block error rate for transmissions between the network node and the user equipment, measured within an observation period exceeds a second threshold level.

7. The method according to claim 5, wherein the number of HARQ retransmissions is measured separately for uplink and downlink, and wherein the user equipment is determined to be in the state of insufficient coverage when any of the threshold levels in any of the links is exceeded.

8. The method according to claim 1,
wherein the assessing comprises
determining that the admitted radio access bearer is in a state of congestion, when the user equipment associated with the admitted radio access bearer is in a state of sufficient coverage, while it is detected that the quality of service requirement of the admitted radio access bearer is not achieved, and
wherein the determining comprises
rejecting any further request for any radio access bearer having a same quality of service requirement as the congested radio access bearer, and which is expected to run at a congestion level that is less or equally prioritized by a scheduler than the congestion level of the congested radio access bearer.

9. The method according to claim 8, wherein the determining further comprises:
setting a second blocking timer upon detecting that the quality of service requirement of the admitted radio access bearer is not achieved because of congestion; and
rejecting any further request for any radio access bearer having the same quality of service requirement as the congested radio access bearer, when the request is received before the second blocking timer expires.

10. The method according to claim 8, wherein, when it is detected that the quality of service requirement of the admitted radio access bearer is not achieved while the user equipment is determined to be in a state of sufficient coverage, the congestion level of the admitted radio access bearer is calculated based on an Allocation and Retention Priority (ARP), and wherein the calculated congestion level of the admitted radio access bearer is stored as a quality of service blocking level for the quality of service requirement of the admitted radio access bearer when it is below any previously stored quality of service blocking level.

11. The method according to claim 10, wherein a calculation of congestion level of a further radio access bearer requested by the user equipment is made based on an ARP and compared with the stored quality of service blocking level, and wherein the request is rejected when the calculated congestion level is equal to or exceeds the stored quality of service blocking level.

12. The method according to claim 1, further comprising:
detecting that the quality of service requirement of the admitted radio access bearer is achieved, wherein the determining further comprises computing a load due to admitted radio access bearers, and comparing the computed load with an admission threshold level, and rejecting any further request for radio access bearer, when the computed load exceeds the admission threshold level.

13. The method according to claim 12, wherein computing the load due to admitted radio access bearers comprises:
calculating the congestion level of the requested radio access bearer;
computing resource usage of the admitted radio access bearers, having a congestion level below, or equal to, the calculated congestion level of the requested radio access bearer; and
comparing the computed resource usage to a threshold level.

14. The method according to claim 1, further comprising:
receiving a request for a radio access bearer with a quality of service requirement from a user equipment;
associating the requested radio access bearer with a congestion level, wherein the congestion level is set to 0 when an Allocation and Retention Priority (ARP) level of the radio access bearer corresponds to a setting when the radio access bearer is not pre-emptable; and otherwise,
setting the congestion level equal to the ARP Priority Level of the radio access bearer, and wherein the determining is based on the associated congestion level, and where a scheduler prioritizes congestion levels with lower values more than congestion levels with higher values.

15. A network node configured for admission control of future requests for radio access bearers, to be received from a user equipment, the network node comprising:
a processing circuit, configured to monitor achievement of quality of service requirement of an admitted radio access bearer, wherein the admitted radio access bearer is a radio interface between the network node and the user equipment, and wherein the monitoring includes monitoring a delay of the admitted radio access bearer configured to detect that the quality of service requirement of the admitted radio access bearer is not achieved based on the delay of the admitted radio access bearer being beyond the quality of service requirement, configured to assess a reason why the quality of service requirement of the admitted radio access bearer is not achieved, wherein the reason is one or more of: insufficient coverage of the user equipment of the admitted radio access bearer and congestion of the admitted radio access bearer, and configured to determine admittance of a further request for radio access bearer, based on the reason why the quality of service requirement of the admitted radio access bearer is not achieved, wherein the admittance determination includes to, in case of congestion of the admitted radio access bearer, allow the further request for radio access bearer of a higher quality of service than that of the admitted radio access bearer.

16. The network node according to claim 15, wherein the processing circuit is further configured to,
in case of insufficient coverage of the user equipment, reject the further request for radio access bearers from that user equipment, and,
in case of congestion of the admitted radio access bearer, reject the further request for radio access bearer of a same quality of service and a same or less important priority as the admitted radio access bearer.

17. The network node according to claim 15, wherein the processing circuit is further configured to identify the user equipment associated with the radio access bearer not achieving the quality of service requirement, configured to detect that the user equipment is in a state of insufficient coverage, and configured to reject any further request for radio access bearers with a quality of service requirement, received from the user equipment detected to be in a state of insufficient coverage.

18. The network node according to claim 15, further comprising:
a first blocking timer, and wherein
the processing circuit is further configured to set the first blocking timer when it is detected that the quality of service requirement of the admitted radio access bearer is not achieved because the user equipment being associated is in a state of insufficient coverage, and configured to reject any further request for a further radio access bearer having a quality of service requirement, received from the user equipment which is associated with the radio access bearer not achieving its quality of service requirement, before the first blocking timer expires or before the user equipment has been identified to enter sufficient coverage.

19. The network node according to claim 15, further comprising:
a transmitter, configured to transmit a radio signal to be received by the user equipment and
a receiver, configured to receive a radio signal transmitted by the user equipment, and
wherein the processing circuit is configured to, upon detecting that the quality of service requirement of the admitted radio access bearer is not achieved, detect a state of insufficient coverage of the user equipment when a number of Hybrid Automatic Repeat Request (HARQ) retransmissions between the network node and the user equipment within an observation period exceeds a first threshold level and detect the state of sufficient coverage when number of retransmissions is below the first threshold level.

20. The network node according to claim 15, further comprising:
a transmitter, configured to transmit a radio signal to be received by the user equipment; and
a receiver, configured to receive a radio signal transmitted by the user equipment, and
wherein the processing circuit is configured to, upon detecting that the quality of service requirement of the admitted radio access bearer is not achieved, detect the state of insufficient coverage of the user equipment when an average value of a block error rate for transmissions between the network node and the user equipment, measured within an observation period exceeds a second threshold level and detect the state of sufficient coverage when the average value of the block error rate is below the second threshold level.

21. The network node according to claim 19, wherein the number of HARQ retransmissions is measured separately for uplink and downlink, and wherein the processing circuit is configured to determine that the user equipment is in the state of insufficient coverage when any of the threshold levels in any of the links is exceeded.

22. The network node according to claim 15, wherein the processing circuit is configured to determine that the admitted radio access bearer is in a state of congestion, when the user equipment associated with the admitted radio access bearer is in a state of sufficient coverage, while it is detected that the quality of service requirement of the admitted radio access bearer is not achieved, and the processing circuit is further configured to reject any further request for any radio access bearer having a same quality of service requirement as the congested radio access bearer, and which is expected to run at a congestion level that is less or equally prioritized by a scheduler than the congestion level of the congested radio access bearer.

23. The network node according to claim 22, further comprising
a second blocking timer, and
wherein the second processing circuit is configured to set the second blocking timer upon detecting that the quality of service requirement of the admitted radio access bearer is not achieved, and configured to reject further request for any radio access bearer having the same quality of service requirement as the congested radio access bearer, when the request is received before the second blocking timer expires.

24. The network node according to claim 22, wherein the processing circuit is configured to, when it is detected that the quality of service requirement of the admitted radio access bearer is not achieved while the user equipment is determined to be in a state of sufficient coverage, calculate the congestion level of the admitted radio access bearer, based on an Allocation and Retention Priority (ARP), the network node further comprises:
a memory, and
wherein the processing circuit is configured to store the calculated congestion level of the admitted radio access bearer in the memory as a quality of service blocking level for the quality of service requirement of the admitted radio access bearer when it is below any previously stored quality of service blocking level.

25. The network node according to claim 24, wherein the processing circuit is configured to calculate a congestion level of a further radio access bearer requested by the user equipment, based on an ARP, and configured to compare it with the stored quality of service blocking level corresponding to the quality of service requirement of the radio access bearer, and configured to reject the request for the further radio access bearer when the calculated congestion level exceeds the stored quality of service blocking level.

26. The network node according to claim 15, wherein the processing circuit is configured to, upon detecting that the quality of service requirement of the admitted radio access bearer is achieved, compute a load due to admitted radio access bearers, and configured to compare the computed load with an admission threshold level, and configured to reject any further request for radio access bearer, when the computed load exceeds the admission threshold level.

27. The network node according to claim 26, wherein the processing circuit is configured to calculate the congestion level of the requested radio access bearer, configured to compute resource usage of the admitted radio access bearers, having a congestion level below, or equal to, the calculated congestion level of the requested radio access bearer, and to compare the computed resource usage to a threshold level.

28. The network node according to claim 15, further comprising:
a receiver, configured to receive a request for a radio access bearer with a quality of service requirement from the user equipment, and wherein the processing circuit is configured to associate the requested radio access bearer with a congestion level, wherein the congestion level is set to 0 when an Allocation and Retention Priority (ARP) level of the radio access bearer corresponds to a setting when the radio access bearer is not pre-emptable, otherwise, the congestion level is set equal to the ARP Priority Level of the radio access bearer, and wherein the processing circuit is configured to determine accessibility of the received request based on the associated congestion level, and where the scheduler prioritizes congestion levels with lower values more than congestion levels with higher values.

29. The method according to claim 6, wherein the average value of a block error rate for transmissions between the network node and the user equipment is measured separately for uplink and downlink, and wherein the user equipment is determined to be in the state of insufficient coverage when any of the threshold levels in any of the links is exceeded.

30. The network node according to claim 20, wherein the average value of a block error rate for transmissions between the network node and the user equipment is measured separately for uplink and downlink, and wherein the processing circuit is configured to determine that the user equipment is in the state of insufficient coverage when any of the threshold levels in any of the links is exceeded.

\* \* \* \* \*